US011901100B2

(12) United States Patent
Grünbichler et al.

(10) Patent No.: US 11,901,100 B2
(45) Date of Patent: Feb. 13, 2024

(54) MULTILAYER VARISTOR AND METHOD FOR MANUFACTURING A MULTILAYER VARISTOR

(71) Applicant: TDK Electronics AG, Munich (DE)

(72) Inventors: Hermann Grünbichler, St. Josef (AT); Jaromir Kotzurek, Deutschlandsberg (AT); Franz Rinner, Frauental an der Laßnitz (AT)

(73) Assignee: TDK Electronics AG, Munich (DE)

( * ) Notice: Subject to any disclaimer, the term of this patent is extended or adjusted under 35 U.S.C. 154(b) by 0 days.

(21) Appl. No.: 17/638,635

(22) PCT Filed: Jul. 26, 2021

(86) PCT No.: PCT/EP2021/070804
§ 371 (c)(1),
(2) Date: Feb. 25, 2022

(87) PCT Pub. No.: WO2022/042971
PCT Pub. Date: Mar. 3, 2022

(65) Prior Publication Data

US 2022/0406493 A1 Dec. 22, 2022

(30) Foreign Application Priority Data

Aug. 26, 2020 (DE) ........................ 102020122299.8

(51) Int. Cl.
*H01C 7/10* (2006.01)
*H01C 7/102* (2006.01)
(Continued)

(52) U.S. Cl.
CPC ........... *H01C 7/1006* (2013.01); *H01C 7/102* (2013.01); *H01C 7/112* (2013.01); *H01C 7/18* (2013.01); *H01C 17/06546* (2013.01)

(58) Field of Classification Search
CPC ...... H01C 7/1006; H01C 7/102; H01C 7/112; H01C 7/18; H01C 17/06546
See application file for complete search history.

(56) References Cited

U.S. PATENT DOCUMENTS 6,087,923 A 7/2000 Ahn et al.
7,649,436 B2 * 1/2010 Nakano .................. H01C 7/112 338/21

(Continued)

FOREIGN PATENT DOCUMENTS

DE 10026258 B4 3/2004
DE 10350343 A1 6/2004

(Continued)

*Primary Examiner* — Kyung S Lee
(74) *Attorney, Agent, or Firm* — Slater Matsil, LLP

(57) ABSTRACT

In an embodiment a method for manufacturing a multilayer varistor includes providing a first ceramic powder for producing a first ceramic material and at least one second ceramic powder for producing a second ceramic material, wherein the ceramic powders differ from each other in concentration of monovalent elements $X^+$ by 50 ppm≤Δc $(X^+)$≤5000 ppm, wherein $X^+$=($Li^+$, $Na^+$, $K^+$ or $Ag^+$), and wherein Δc denotes a maximum concentration difference occurring between an active region and a near-surface region of the multilayer varistor, slicking of the ceramic powders and forming of green films, partially printing of a part of the green films with a metal paste to form inner electrodes, stacking printed and unprinted green films, laminating, decarbonizing and sintering the green films and applying outer electrodes.

31 Claims, 1 Drawing Sheet

(51) Int. Cl.
*H01C 7/112* (2006.01)
*H01C 7/18* (2006.01)
*H01C 17/065* (2006.01)

(56) References Cited

U.S. PATENT DOCUMENTS

| | | | | |
|---|---|---|---|---|
| 7,683,753 | B2 * | 3/2010 | Yoshida | H01C 7/112 338/21 |
| 2004/0169267 | A1 | 9/2004 | Matsuoka et al. | |
| 2005/0276001 | A1 * | 12/2005 | Matsuoka | H01C 7/18 361/306.3 |
| 2009/0021340 | A1 | 1/2009 | Koyama | |
| 2014/0167909 | A1 | 6/2014 | Itami et al. | |
| 2021/0217545 | A1 | 7/2021 | Feichtinger et al. | |

FOREIGN PATENT DOCUMENTS

| | | | |
|---|---|---|---|
| DE | 102017105673 | A1 | 9/2018 |
| DE | 102018116221 | A1 | 1/2020 |
| EP | 3300087 | A1 | 3/2018 |
| JP | S6057905 | A | 4/1985 |
| JP | H113809 | A | 1/1999 |
| JP | H11307312 | A | 11/1999 |
| JP | 2005051052 | A | 2/2005 |
| JP | 3735151 | B2 | 1/2006 |
| JP | 2008182280 | A | 8/2008 |
| JP | 2016003166 | A | 1/2016 |

* cited by examiner

MULTILAYER VARISTOR AND METHOD FOR MANUFACTURING A MULTILAYER VARISTOR

This patent application is a national phase filing under section 371 of PCT/EP2021/070804, filed Jul. 26, 2021, which claims the priority of German patent application 102020122299.8, filed Aug. 26, 2020, each of which is incorporated herein by reference in its entirety.

TECHNICAL FIELD

The present invention relates to a multilayer varistor. The present invention further relates to a method for manufacturing a multilayer varistor.

BACKGROUND

Multilayer varistors are used as effective protection elements against temporary overvoltages (such as ESD—"Electrostatic Discharge"). In the rapidly developing communications technology, there is an increasing need for protective elements to safeguard sensitive electronics. Because of the high frequencies involved in signal transmission, and because these protective elements are installed directly in the lines, the capacitances of these components must be kept as low as possible. Otherwise, interference and losses will occur within the signal-carrying lines.

Reducing the capacitance of a multilayer varistor presents considerable difficulties. By design, the active region (overlap area) and thus the capacitance can be reduced, but this reduces the leakage current and the protective effect proportionally. From the materials side, a material with a lower dielectric constant (DK) would be desirable. The material used for multilayer varistors is made of doped zinc oxide (ZnO). The DK of this ceramic is dominated by barrier layers between the ZnO grains. The series and parallel connection of the individual barrier layers results in the capacitance—but also the breakdown voltage of the active region. Since the breakdown voltage is specified in the design of the component, this also results in the capacitance of the active region. The DK of the ZnO ceramics is largely coupled with the breakdown voltage and therefore cannot be used as a degree of freedom to reduce the capacitance.

Contributing to the capacitance of a varistor is not only the capacitance of the active volume (the ceramic between the inner electrodes) but also the stray capacitance of the ceramic component outside the active volume (cover layers and insulation zone). As the active region in the component is reduced, the proportion of the total capacitance accounted for by the stray capacitance increases more and more, thus limiting the effect that can be achieved by a design with a minimum overlap area of the electrodes. Therefore, to efficiently reduce the capacitance of a varistor, it is necessary to reduce this stray capacitance as much as possible.

Different methods are known to reduce the conductivity and to reduce the stray capacitance in the area outside the inner electrodes, but they are either not very effective or have other disadvantages. The simplest way to achieve this is to glass the surface of the multilayer varistor after sintering. This glass layer has the additional advantage of chemically insulating the ceramic, thus increasing the durability of the component. Therefore, the additional use of this method can also be useful when other methods are used. Since the glass layer is only very thin, however, the effectiveness of this method is limited, however, and the use of other methods or the combination with other methods is advantageous.

In German Patent DE 100 26 258 B4, instead of the protective glass layer, a bismuth-containing top layer is applied as electroplating protection, which can be sintered together with the varistor ceramic. The chemical composition of the cover layer is very different from that of the ZnO ceramic, resulting in a disadvantageous diffusion and reaction zone during sintering. An influence on the dielectric constant by the cover layer is not discussed.

Japanese Patent JP 3735151 B2 describes a method in which the outermost regions of the ceramic are chemically modified after sintering. During an additional heat treatment, lithium or sodium is diffused into the surface of the ceramic body. Doping with acceptors reduces the leakage current and the relative permittivity of the outermost layer. The capacitance of the multilayer varistor can be significantly reduced in this way. The disadvantage of this method is that this subsequent modification represents a considerable expense. Furthermore, further heat treatment would be required to apply an additional glass layer on the outside, which is extremely difficult due to the high diffusion rates of sodium and lithium.

Japanese Application JP H-113809 A describes a multilayer varistor consisting of an insulating carrier layer with low relative permittivity, on which the actual varistor ceramic is laminated on top. The carrier layer itself is also produced from a ceramic with a low relative permittivity using a layer-by-layer process. One disadvantage of this multilayer varistor is the costly production of the same: instead of a uniform ceramic, two different ceramics with very different properties are required. This can be achieved by a different chemical composition, which results in a weak bond between the carrier layer and the varistor ceramic.

German Application DE 10 2018 116 221 A1 describes a multilayer varistor consisting of two chemically very different materials that differ in ZnO grain size after the sintering process. The goal of this multilayer varistor design is to keep the current flow in the component away from thermomechanical weak points and thus increase the pulse strength of the protection element. An effect of the chemically very different materials, which are both used in the active region for example, on the capacitance of the multilayer varistor is not in focus.

German Application DE 10 2017 105 673 A1 describes the combination of two different ZnO ceramics to increase the pulse strength of the device. The two materials have to be bonded to the electrodes to show the effect. The effects in near-surface regions as well as the effect on the capacitance are not addressed.

Thus the known methods show clear disadvantages or the effectiveness in lowering the stray capacitance is not given.

SUMMARY OF THE INVENTION

Embodiments provide a multilayer varistor and a method for manufacturing a multilayer varistor which solve the above problems.

According to one embodiment, a multilayer varistor is described.

The multilayer varistor comprises a ceramic body. The ceramic body has a plurality of layers. A plurality of inner electrodes are formed in the ceramic body. The inner electrodes have, for example, silver, palladium, platinum, or an alloy of these metals.

The ceramic body has an active region. The ceramic body further comprises an inactive region. The active region is the area between the different inner electrodes of different polarity, which is decisive for the current flow between them. In contrast, the regions in the ceramic body of the multilayer varistor that do not (or do not significantly) contribute to the current flow between the differently contacted inner electrodes are referred to as the inactive region.

The ceramic body has a near-surface region. The near-surface region is adjacent to a top side and a bottom side of the multilayer varistor, respectively. The near-surface region exhibits only minimal electrical conductivity. The near-surface region is substantially electrically insulating. The near-surface region comprises a cover layer and/or an insulation zone of the multilayer varistor.

The ceramic body comprises at least a first or primary ceramic material. Preferably, the multilayer varistor comprises exactly one first or primary ceramic material. The ceramic body comprises at least one second or modified ceramic material. The main component of the two ceramic materials is zinc oxide (ZnO). In particular, the two ceramic materials are based on ZnO.

The first and the second ceramic material differ in a concentration of monovalent elements $X^+$ or elements with stable oxidation stage +I, respectively. $X^+$ is selected from $Li^+$, $Na^+$, $K^+$ or $Ag^+$. Preferably, the monovalent elements have a low diffusion constant. Preferably, the multilayer varistor is manufactured by a method which will be described in detail later.

The second or modified ceramic material is doped with the monovalent elements. For example, the second ceramic material is doped with potassium oxide. The first or primary ceramic material may be free of doping with monovalent elements. Alternatively, however, the first ceramic material may be slightly doped with monovalent elements.

The dopants by which the ceramic materials differ occur in low concentrations. Due to the doping with monovalent elements, the electrical properties of the second/modified ceramic material are indeed very different from those of the first/primary ceramic material. However, there is no significant chemical difference between the ceramic materials. In particular, the two materials are otherwise nearly identical.

Doping with monovalent elements even in small amounts causes a significant reduction in the dielectric constant. Consequently, the second or modified ceramic material has a lower dielectric constant than the first or primary ceramic material. Thus, a multilayer varistor with reduced stray capacitance and consequently reduced total capacitance can be provided.

According to one embodiment, the highest concentration of monovalent elements $X^+$ is present in the near-surface region. The lowest concentration of monovalent elements $X^+$ is present in the active region. The concentration of monovalent elements consequently decreases starting from the surface towards the inner region/active region of the multilayer varistor. Accordingly, the value for the dielectric constant increases from the surface toward the inner region of the multilayer varistor. This reduces the stray capacitance of the varistor. Consequently, the total capacitance of the varistor is effectively reduced.

According to one embodiment, the ceramic materials differ chemically by 1% from each other. In other words, the ceramic materials are chemically approximately identical. Thus, both materials can be excellently processed with each other. For example, the layers made of the modified materials can be sintered together without defects. This provides a particularly reliable multilayer varistor.

According to an embodiment, the relative permittivities εr of the first and second ceramic material differ from each other by ≥factor 5. Consequently, by only slightly doping with monovalent elements, the stray capacitance of the varistor can be significantly reduced in a simple manner.

According to an embodiment, the first/primary ceramic material is arranged in the active region. The second/modified ceramic material forms an insulating cover layer of the ceramic body. In particular, the second ceramic material is arranged at the top side and at the bottom side of the multilayer varistor. Consequently, the multilayer varistor has an insulating cover layer or sheathing with a low relative permittivity. The stray capacitance of the multilayer varistor is thus significantly reduced in a simple manner compared to conventional multilayer varistors.

According to an embodiment, the ceramic materials differ from each other in the concentration of monovalent elements $X^+$ by a maximum of 50 ppm≤$\Delta c(X^+)$≤5000 ppm. Here, Δc denotes the maximum concentration difference that occurs between the active region and the near-surface region.

In other words, the concentration of acceptors is at most between 50 ppm and 5000 ppm higher in the second ceramic material than in the first ceramic material. Preferably, the ceramic materials of the multilayer varistor differ from each other by 100 ppm≤$\Delta c(X^+)$≤1000 ppm.

The concentration of monovalent elements $X^+$ in the active region is preferably <100 ppm, preferably <50 ppm. Consequently, the first ceramic material is approximately free of monovalent elements. The number of monovalent elements is in particular due to their diffusion from the second ceramic material during the manufacturing of the multilayer varistor.

Since the monovalent elements, in which the two ceramic materials differ, have only a small concentration difference (concentration gradient), diffusion of same into the active region even during sintering can be neglected. Therefore, the cover layers (second or modified ceramic material) can be dimensioned with sufficiently high thicknesses, thus enhancing the shielding effect.

According to one embodiment, the ceramic body has at least three ceramic materials. In particular, the ceramic body has the first/primary ceramic material, the second/modified ceramic material, and a third/modified ceramic material. However, the ceramic body may have more than three ceramic materials. For example, the ceramic body may further comprise a fourth/modified ceramic material.

The third ceramic material is disposed between the first ceramic material and the second ceramic material. The third ceramic material is arranged in the inactive region and, in particular, in the near-surface region of the multilayer varistor. The third ceramic material forms an insulation zone near the surface. The three ceramic materials differ chemically by ≤1%.

The three ceramic materials differ in the concentration of monovalent elements. The first ceramic material (active region) has the lowest concentration of monovalent elements. The second ceramic material (outer insulating cover layer) has the highest concentration of monovalent elements. The third material(near-surface insulating zone) has a concentration of monovalent elements intermediate between that of the first and second ceramic material.

In particular, the concentration of monovalent elements $X^+$ decreases gradually from the near-surface region towards the active region (concentration gradient). Thus, local chemical differences can be effectively reduced.

According to an embodiment, a thickness of the second and/or the third ceramic material is adapted to a diffusion behavior of the monovalent element. In particular, the thickness is chosen such that as little diffusion as possible of the acceptors into the active region occurs. The thickness of the cover layers is thus adapted to the diffusion constant of the monovalent element. In particular, the thickness is reduced as the diffusion constant increases. Due to the reduced diffusion, a defined concentration gradient of monovalent elements is created and, associated with this, a defined gradient of the electrical properties, especially the dielectric constant.

The thickness of the second and third ceramic material is based on a total height of the component and its internal structure. As a design principle, the higher the proportion of the second and third ceramic materials in the inactive cover layers, the higher the efficiency. On the other hand, this increases the risk that the monovalent element may diffuse into the active region during sintering. For example, a safety margin of 100 μm may be useful. In other words, after the last printed laminate, there is still another 100 μm of the first ceramic material as a "diffusion buffer". But a smaller safety distance is also conceivable. Alternatively, after the last printed layer, it may also be continued directly with the second and third ceramic materials.

According to a further embodiment, a method for manufacturing a multilayer varistor is described. Preferably, the method produces the multilayer varistor described above. Any features disclosed with respect to the multilayer varistor or the method are also disclosed correspondingly with respect to the respective other embodiment, and vice versa, even if the respective feature is not explicitly mentioned in the context of the respective embodiment. The method comprises the following steps:

A) Providing a first or primary ceramic powder for producing a first ceramic material. Providing at least one second or modified ceramic powder for producing a second ceramic material.

The ceramic powders substantially comprise ZnO. The second ceramic powder has a doping, in particular a minor doping, of monovalent elements $X^+$, for example $Li^+$, $Na^+$, $K^+$ or $Ag^+$. The first ceramic powder may be free of doping of monovalent elements or have minor doping of monovalent elements. In particular, the concentration of monovalent elements in the first ceramic powder is several times lower than the concentration of monovalent elements in the second ceramic powder. The dopant has a low diffusion constant.

For example, there may be doping with potassium (for example, $K_2O$, $KC_4H_5O_6$, or $K_2Co_3$). The latter in particular is characterized by the fact that—due to a high melting point and a high decomposition temperature—few losses occur during sintering. Alternatively, Li or Na can also be used as dopants, for example. Na and Li are hardly or not at all susceptible to peroxide formation in air, and the melting points of the metals are very high. This means that losses during sintering can be kept low.

The dopant occurs only in a low concentration. The ceramic powders differ in the concentration of monovalent elements $X^+$ by 50 ppm≤$\Delta c(X^+)$≤5000 ppm. Here, Δc denotes the maximum concentration difference that occurs between an active region and a near-surface region of the finished multilayer varistor.

In an alternative embodiment, a third ceramic powder may additionally be provided to produce a third ceramic material. Here, the concentration of monovalent elements $X^+$ in the third ceramic powder is less than in the second ceramic powder but greater than in the first ceramic powder. Thus, the third ceramic powder has a medium concentration of monovalent elements.

B) Slicking of the ceramic powders in a solvent and film drawing or formation of green films.

C) Partial printing of a part of the green films with a metal paste, for example silver and/or palladium, to form inner electrodes. Here, those green films are partially printed with metal paste which have a lower concentration of monovalent elements $X^+$ than the other green films. In particular, those green films with the lowest concentration of monovalent elements are printed, i.e. the green films which are made from the first ceramic powder.

Furthermore, further green films with the lowest or medium concentration of monovalent elements can be printed with metal paste to form Faraday or protective electrodes.

D) Stacking of printed and unprinted green films. The green films are stacked in such a way that the second ceramic material forms a cover layer of the multilayer varistor. If a third ceramic material is present, the green films are stacked in such a way that the green films of the third ceramic material are arranged between the green films of the first and the third ceramic material.

In particular, the green films are stacked in such a way that a defined concentration gradient of monovalent elements $X^+$ is formed, with the concentration decreasing starting from the second ceramic material (cover layer) to the first ceramic material (active region).

E) laminating, decarbonizing and sintering of the green films. Preferably, the green films are sintered at 1100° C.

F) Application of outer electrodes for electrical contacting of the multilayer varistor. The outer electrodes can be of single-layer (CN type) or multilayer design. In the case of a three-layer outer electrode, an additional Ni layer and a solderable Sn layer would then be applied in an electroplating process. Before electroplating, the component must be provided with a protective layer (glazing).

Of particular importance in the process are the modified ceramic materials. Since the modified ceramic materials are to be produced by the same process as the primary ceramic material, and the different ceramic materials are to be processed together in the stacking, laminating and sintering steps, it is important that the mechanical and thermal properties of the materials are well matched. At the same time, the electrical properties must be adapted to the widely varying requirements.

Here, the concept of a low relative permittivity cover layer or sheathing is used to reduce the capacitance of a multilayer varistor. Previous solutions require complex procedures and/or additional process steps for the production of the same or are unsuitable for the reduction of the stray capacitance. The diffusion of lithium into the finished sintered component, for example, presents a particular challenge. Highly concentrated lithium compounds (e.g. $Li_2CO_3$) must be used to achieve sufficient penetration depth, on the other hand, there is the risk that the lithium will penetrate into the active volume and endangers the functionality of the component.

If, on the other hand, a ceramic with a more strongly deviating chemical composition is used as the cover layer, the disadvantage of minimal bonding between the cover layer and the varistor ceramic is added to the manufacturing effort. The mechanical properties (modulus of elasticity, strength, thermal expansion, etc.) sometimes differ greatly from one another, since a sufficient difference in electrical properties is necessary. As a result, the mechanical stability of the entire component is negatively affected.

These disadvantages are effectively circumvented by the method described above and the resulting multilayer varistor.

BRIEF DESCRIPTION OF THE DRAWINGS

The drawings described below are not to be taken as true to scale. Rather, individual dimensions may be enlarged, reduced or even distorted for better representation.

Elements which resemble each other or which perform the same function are designated with the same reference signs.

DETAILED DESCRIPTION OF ILLUSTRATIVE EMBODIMENTS

Figure 1:
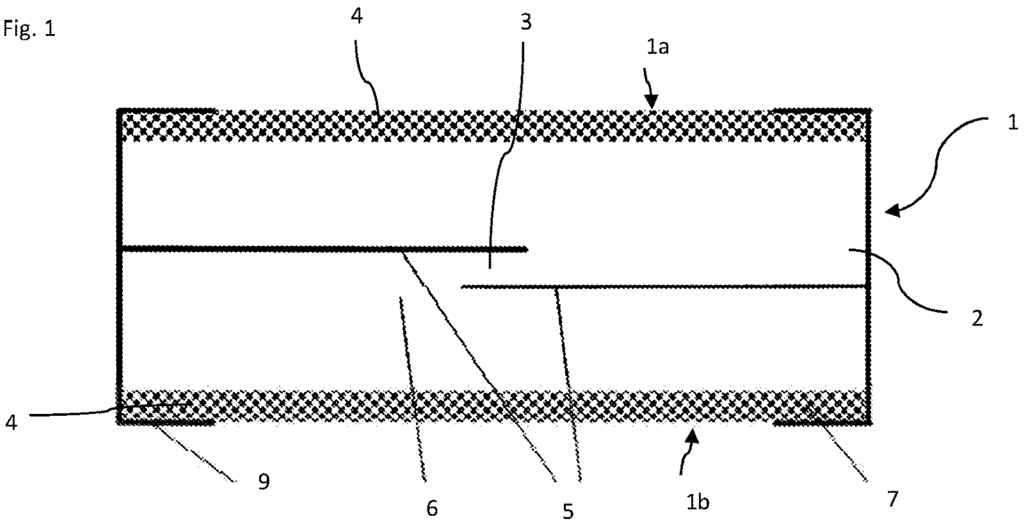
FIG. 1 shows a sectional view of a multilayer varistor according to a first embodiment

FIG. 1 shows a first embodiment of a multilayer varistor 1. The multilayer varistor 1 has a ceramic body 2. A plurality of inner electrodes 5 are formed in the ceramic body 2. In FIG. 1, only two inner electrodes 5 are shown. Of course, the multilayer varistor 1 can have more than two inner electrodes 5. The inner electrodes 5 comprise silver, palladium, platinum or an alloy of these metals.

In this embodiment, the inner electrodes 5 are arranged alternately and overlap in an inner region of the multilayer varistor 1. The overlapping region forms an active region 3 of the multilayer varistor 1.

The multilayer varistor 1 further has a near-surface region 4. The near-surface region 4 exhibits only minimal electrical conductivity. The near-surface region 4 adjoins a top side 1*a* and a bottom side 1*b* of the multilayer varistor 1, as can be seen from FIG. 1. The near-surface region 4 comprises a cover layer or an insulation region of the multilayer varistor 1.

In this embodiment, the multilayer varistor 1 further has two outer electrodes 9. However, the multilayer varistor 1 may have more than two outer electrodes 9. The outer electrodes 9 are electrically connected to the inner electrodes 5 for electrically contacting the multilayer varistor 1. The outer electrodes 9 are formed on side surfaces of the multilayer varistor 1. Furthermore, the outer electrodes 9 are also formed on portions of the bottom side 1*b* and the top side is of the multilayer varistor 1.

According to the embodiment shown, the outer electrodes 9 are formed in a single layer.

Alternatively, the outer electrodes 9 may also have a multilayer structure (not explicitly shown). Preferably, in this case, the respective outer electrode 9 has a first or inner layer for contacting the inner electrodes 9. The first layer preferably has silver. The respective outer electrode 9 has a second or middle layer as a diffusion barrier. The second layer preferably comprises nickel. The respective outer electrode 9 has a third or outer layer that enables soldering of the multilayer varistor 1 to circuit boards. The third layer preferably has tin. In this embodiment, the varistor 1 must be provided with a protective layer (preferably glass) before electroplating. In particular, in this case, a further protective layer (electroplating protection, for example glass) is applied (not explicitly shown) to the upper side is and the lower side 1*b* (i.e. over the second ceramic material 7 described below). This glass layer chemically insulates the ceramic body 2 and thus increases the durability of the varistor 1.

In the embodiment according to FIG. 1, the ceramic body 2 comprises two ceramic materials or varistor ceramics 6, 7.

A first or primary ceramic material 6 is formed in an inner region of the multilayer varistor 1. In particular, the active region 3 has the first ceramic material 6. A second or modified ceramic material 7 is formed in an edge region of the multilayer varistor 1. In particular, the second ceramic material is arranged in the near-surface region 4 and thus substantially in the inactive region. However, in addition to the second ceramic material 7, the inactive region also comprises a portion of the first ceramic material 6, as shown in FIG. 1.

The ceramic materials 6, 7 comprise ZnO. In particular, ZnO is the main component of the ceramic materials 6, 7. Furthermore, the ceramic materials 6, 7 may comprise a varistor forming oxide such as bismuth oxide or a rare earth oxide (e.g. praseodymoxide) as well as other oxides which improve the varistor properties.

The ceramic materials 6, 7 are chemically approximately identical. In particular, the ceramic materials 6, 7 chemically match 99%. However, the ceramic materials 6, 7 have different dielectric constant $\varepsilon o^*\varepsilon r$ or relative permittivity cr. In particular, the dielectric constants $\varepsilon o^*\varepsilon r$ or relative permittivity $\varepsilon r$ of the ceramic materials 6, 7 differ from each other by a factor ≥5. Here, the dielectric constant of the first ceramic material 6—and thus in the active region 3—is greater than the dielectric constant of the second ceramic material 7—and thus in the near-surface region 4.

This is achieved by the fact that the ceramic materials 6, 7 differ from each other in the concentration of monovalent elements $X^+$($X^+$ stands for $Li^+$, $Na^+$, $K^+$ or $Ag^+$).

For example, the ceramic materials differ from each other by a maximum of 50 ppm<$\Delta c$ ($X^+$)<5000 ppm. Here, $\Delta c$ denotes the maximum concentration difference that occurs between the active region 3 and the near-surface region 4. Preferably, the concentration of monovalent elements in the near-surface region 4 is 100 ppm to moo ppm higher than in the active region 3.

The monovalent elements $Li^+$, $Na^+$, $K^+$, $Ag^+$ act as "acceptor doping" in the semiconducting ZnO. Therefore, the above doping can be applied to all ZnO based varistor ceramics (regardless of the formulation).

Overall, the ceramic materials 6, 7 must be doped with acceptors that have relatively low diffusion constants. Furthermore, the dopants in which the ceramic materials 6, 7 differ, must occur in low concentrations.

It is advantageous if the concentration $X^+$ in the active region 3 (concentration of monovalent elements in the first ceramic material 6) is at a low level ($X^+$<100 ppm). In other words, in the active region 3 the concentration of monovalent elements $X^+$ is much lower than in the inactive region or near-surface region 4.

A low concentration of monovalent elements $X^+$ is associated with a large (or greater) dielectric constant. Consequently, the active region 3 has a higher dielectric constant/relative permittivity than the near-surface region 4. An increase in the concentration of monovalent elements $X^+$ causes a decrease in the dielectric constant. Overall, a significant decrease in the dielectric constant is obtained even with small amounts of monovalent elements added.

In summary, the two ceramic materials 6, 7 are combined in such a way that the highest concentration of monovalent elements $X^+$ is present in the near-surface region 4 and the lowest concentration in the active region 3. The second ceramic material 7 thus serves as an insulating cover layer with acceptor doping and low relative permittivity. Starting from the near-surface region 4, the concentration gradually decreases toward the active region 3 (concentration gradient). This significantly reduces the parasitic capacitance/stray capacitance of the multilayer varistor 1.

Since the ceramic materials 6, 7 are chemically nearly identical, no mechanical (cracks, bending) and chemical (reaction, diffusion zones) problems occur during sintering of the ceramic.

Figure 2:
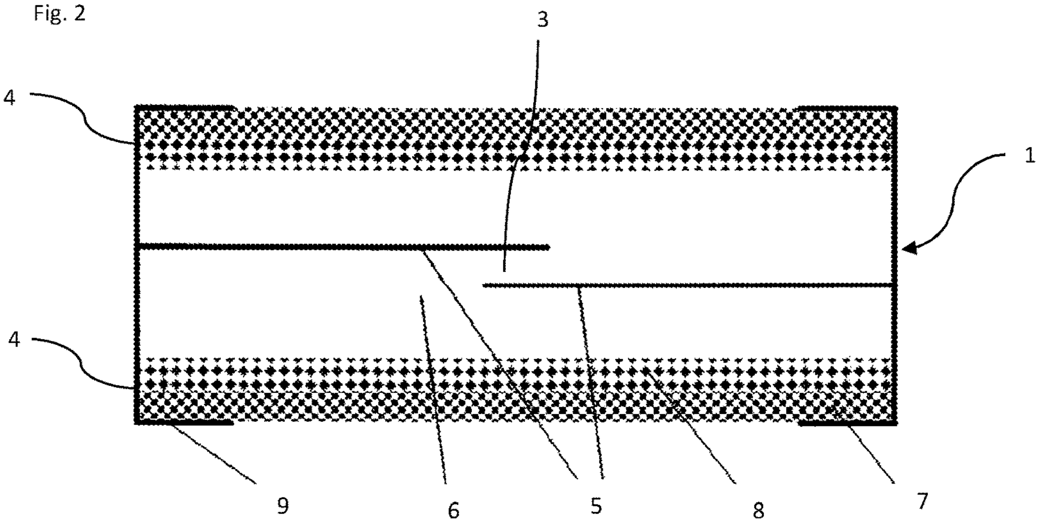
FIG. 2 shows a sectional view of a multilayer varistor according to a further embodiment.

FIG. 2 shows a second embodiment of a multilayer varistor 1. With regard to the design and arrangement of the inner electrodes 5 and outer electrodes 9, reference is made to the description in connection with FIG. 1.

In contrast to the multilayer varistor shown in FIG. 1, the multilayer varistor in this embodiment has three ceramic materials/varistor ceramics 6, 7, 8 with different concentrations of monovalent elements $X^+$. The first or primary ceramic material 6 is arranged in the active region 3—as already described in connection with FIG. 1. The second and third ceramic materials (modified ceramic materials) 7, 8 are arranged in the near-surface region 4 the surface. The third ceramic material 8 is arranged between the first and second ceramic materials 6, 7.

The first ceramic material 6 has a low concentration of monovalent elements. Thus, the first ceramic material 6 exhibits a high dielectric constant. The second ceramic material 7 exhibits a higher concentration of monovalent elements than the first ceramic material 6. The concentration of monovalent elements in the third ceramic material 8 is intermediate between that of the first ceramic material 6 and the second ceramic material 7. In particular, the first ceramic material 6 exhibits the lowest concentration of monovalent elements and the second ceramic material 7 exhibits the highest concentration of monovalent elements. The third ceramic material 8 has a medium concentration. Thus, a concentration gradient is created.

The concentration of the acceptors in the second and third ceramic materials 7, 8 is, for example, between 50 ppm and 5000 ppm higher than in the active ceramic layer (first or primary ceramic material 6). The second and third ceramic materials 7, 8 serve as an insulating cover layer or insulation zone with acceptor doping and low relative permittivity.

Figure 3:
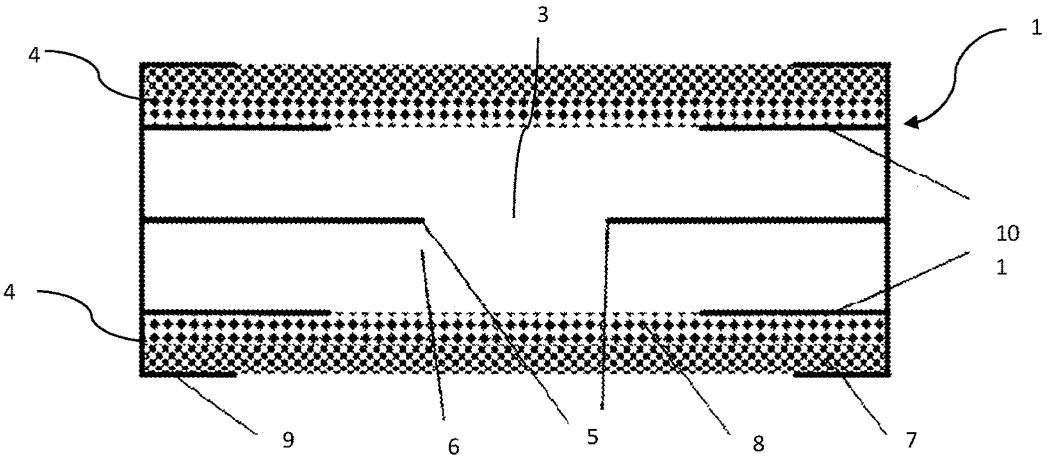
FIG. 3 shows a sectional view of a multilayer varistor according to a third embodiment.

FIG. 3 shows a third embodiment of a multilayer varistor 1. With respect to the design and arrangement of the outer electrodes 9, reference is made to the description in connection with FIG. 1. In contrast to the embodiments shown in FIGS. 1 and 2, the inner electrodes 5 in this embodiment are arranged in a tip-to-tip position. The region between the tips of the inner electrodes 5 forms the active region 3 of the multilayer varistor 1. In addition, the multilayer varistor 1 has metallic protective or Faraday electrodes 10 which increase the protective function of the multilayer varistor 1 against electrostatic discharges.

Analogous to the multilayer varistor described in connection with FIG. 2, the multilayer varistor 1 in this embodiment example has three ceramic materials 6, 7, 8 with different concentrations of monovalent elements X.

The Faraday electrodes 10 help to prevent diffusion between the ceramic materials 6, 7, 8. Due to the reduced diffusion, a defined concentration gradient is created and, consequently, a defined gradient of the electrical properties, especially the dielectric constant. The thicknesses of the cover layers (second and third ceramic materials 7, 8) are selected so that as little diffusion as possible of the acceptors into the active region 3 occurs. The thickness of the cover layers is understood to be a respective extension of the second ceramic material 7 and the third ceramic material 8 perpendicular to a main extension of the multilayer varistor 1.

Overall, the concentration of the acceptors in the second and third ceramic materials 7, 8 is between 50 ppm and 5000 ppm (preferably between 100 ppm and 1000 ppm) higher than in the active ceramic layer (first ceramic material 6). The second and third ceramic materials 7, 8 serve as an insulating cover layer with acceptor doping and low relative permittivity. With regard to the further features of the ceramic materials 6, 7, 8, reference is made to the description of FIG. 2.

The particular advantage is that the electrical properties of the modified varistor ceramics 7, 8 (second and third ceramic materials 7, 8) are very different from those of the original varistor ceramics (first or primary ceramic material 6) without any significant chemical differences between the materials. Therefore, the materials are otherwise nearly identical and can be processed without problems.

In the following, a method for manufacturing a multilayer varistor 1, in particular a multilayer varistor according to one of the above embodiments, is described. The method comprises the following steps:

A) In a first step, ceramic powders are provided from individual components. In this process, a first ceramic powder is provided for forming the first ceramic material (primary ceramic material) 6. A second ceramic powder is further provided to form the second ceramic material (modified ceramic material) 7. In one embodiment, a third ceramic powder may also be provided to form the third ceramic material (modified ceramic material) 8 (see FIGS. 2 and 3). The ceramic powders are chemically 99% identical. The ceramic powders essentially have ZnO as the base material.

Table 1 shows a possible composition of the base material of the ceramic powders. Of course, other compositions are also conceivable, with ZnO being the main constituent of the ceramic material in each case.

TABLE 1

Composition of the base material of the ceramic powders.

| | Amount [mol Element] |
|---|---|
| Main constituent | |
| Zn (ZnO) | 94.0% |
| Doping element [-oxide] | |
| Al ($Al_2O_3$) | 400 ppm |
| Ca (CaO) | 150 ppm |
| Co ($Co_3O_4$) | 3.50% |
| Cr ($Cr_2O_3$) | 1000 ppm |
| K ($K_2O$) | <100 ppm *) |
| Pr ($Pr_6O_{11}$) | 4900 ppm |
| Y ($Y_2O_3$) | 1.825% |

*) Cross impurities and input by process: typically 1-10 ppm potassium.

However, the ceramic powders differ in the concentration of monovalent elements $X^+$. In particular, the ceramic powders differ in the concentration $X^+$ by 50 ppm$\le\Delta c(X^+)\le$5000 ppm.

In this case, the first or primary ceramic powder has the lowest concentration of acceptors/monovalent elements. Preferably, the concentration of monovalent elements $X^+$ in the first ceramic powder is <100 ppm. The second ceramic powder has the highest concentration of acceptors/monovalent elements. The third ceramic powder has an intermediate/medium concentration of acceptors/monovalent elements.

In a second step B), green films are formed from the ceramic powders. For this purpose, the powders are first ground, spray-dried and decarburized. The decarburized powders are slurried with organic binder and dispersant and then drawn into green films. The films are cut to size.

In a further step C), a part of the green films is partially printed with a metal paste (preferably silver and/or palladium) to form the inner electrodes 5. Only those green films are partially printed with the metal paste which are later arranged in the active region 3. In other words, only the green films made of the first ceramic powder are printed with the metal paste.

Optionally, another metal paste (preferably silver and/or palladium) can be printed on a part of the green films to form protective electrodes 10 (see FIG. 3). Preferably, this metal paste is printed on the green films with the lowest and/or the medium concentration of monovalent elements (FIG. 3).

In a further step D), printed and unprinted green films are stacked. Stacking is carried out in such a way that the final multilayer varistor 1 has a defined concentration gradient of monovalent elements $X^+$, with the concentration decreasing from the second ceramic material 7 via the third ceramic material 8 (FIGS. 2 and 3) to the first ceramic material 6.

In a further step, the green films are laminated, decarburized and sintered. The sintering temperature is preferably 1100° C.

In a final step, external electrodes 9 are applied.

The method produces a multilayer varistor 1 which has a very low stray capacitance and thus a low capacitance.

An advantage is that the manufacturing process involves very little effort. The modified varistor ceramic (second or third ceramic material 7, 8) is treated in production in the same way as the original/primary varistor ceramic (first ceramic material 6), since the materials differ only slightly chemically. Therefore, the powder, slurry and film properties of the materials are very similar and can be processed in the same way. The same applies to the processing of the foils into laminates and the finishing of the components (cutting, decarburization, sintering). Since the elements, such as potassium, in which the materials differ from each other, only have a small concentration difference (concentration gradient), diffusion of the same into the active volume even during sintering can be neglected. Therefore, the cover layers can be dimensioned with sufficiently high thicknesses, which enhances the shielding effect.

To characterize the cover layers, modifications (variations with modified doping according to Table 2 below) were produced in a previous test procedure starting from the base material (see Table 1) and their relative permittivity determined. The powder mixtures were ground, evaporated and decarburized. The decarburized powders were granulated with organic binder and pressed into disks (15 mm diameter, 1 mm height). The discs were sintered and ground to 0.3 mm height. Finally, the disks were circularly (5 mm diameter) imprinted on both sides with silver paste, and baked.

The capacitances of the disks were measured at 1V and 1 kHz (see Table 2). Using the formula for the capacitance of the plate capacitor, the dielectric constant or relative permittivity of the ceramic could be determined: $\varepsilon r=(C^*d)/(A^*\varepsilon o)$.

TABLE 2

Results of the base material and the modified varistor ceramics.

| Composition | Addition of $X^+$(X = potassium) | Sintering temperature | Relative permittivity |
|---|---|---|---|
| Base material (= reference) | Without addition | 1100° C | 80 |
| Base material | 100 ppm K | 1100° C | 73 |
| Base material | 1000 ppm K | 1100° C | 54 |
| Base material + 1000 ppm La | 1000 ppm K | 1100° C | 10 |
| Base material | 5000 ppm K | 1100° C | 9.4 |

The characterization test procedure provided possible compositions with reduced relative permittivity suitable for testing the invention on the multilayer varistor.

Finally, the following is a brief summary of the testing of the invention.

Three ceramic powders were prepared, which differed only in potassium and lanthanum content in the ppm range (see Table 2). The main constituent of all powders was zinc oxide (see Table 1).

The composition of the first ceramic powder corresponded to that of the base material (see Table 1). The second ceramic powder was additionally doped with 1 000 ppm potassium. The third ceramic powder was additionally doped with 1 000 ppm potassium and 1 000 ppm lanthanum.

The powder mixtures thus prepared were milled, spray-dried and decarburized. The decarburized powders were slurried with organic binder and dispersant and drawn into films. The films were cut to size, printed with palladium paste, stacked, and cut into multilayer components.

The simplest design (see FIG. 1) of a 1206 ML varistor with 2 inner electrodes (120 micrometer electrode gap and 0.8 $mm^2$ overlap area) was chosen for testing. With the three types of ceramic foils, three types of components were produced.

The first type of components consisted of the base material throughout (=the reference type). The second type of components consisted in the core of the base material with a cover layer of the second ceramic (with increased potassium concentration). The third type of component consisted of a core of the base material with a cover layer of the third ceramic (with increased potassium concentration and lanthanum-doped).

The components produced in this way were sintered at 1100° C. in each case. Micrographs showed that the cover layers were flawlessly (no cracks, etc.) sintered with the core layer. Finally, the components were metallized with outer electrodes of a layer of silver and baked.

The capacitances of the components were measured at 1V and 1 MHz. The first type of components (reference type) had a capacitance of 17.7±3.1 pF. The second type of components (cover layer with increased potassium concentration) showed a capacitance of 13.2±1.3 pF. This corresponds to a 25% reduction in capacitance. The third type of components (cover layer with increased potassium concentration and lanthanum doped) showed a capacitance of 11.1±2.4 pF. This corresponds to a reduction in capacitance of 37%. It could thus be shown that even the simplest way of applying embodiments of the invention leads to a significant reduction in the total capacitance of the multilayer varistor.

The current/voltage characteristics of the components were measured with increasing static current levels in the range of 10 nA to 1 mA. The first type of components (reference type) showed a varistor voltage at 1 mA of 2159±144 V $mm^{-1}$. The second type of components showed a varistor voltage at 1 mA of 2210±172 V $mm^{-1}$. This corresponds to a change in varistor voltage of only 2%. The third type of components showed a varistor voltage at 1 mA of 2273±183 V $mm^{-1}$. This corresponds to a change in varistor voltage of 5%.

Thus, it can be seen that the varistor voltage ($U_v$@1 mA) is hardly affected by the application of the cover layers/modified varistor ceramics. It can be concluded that the active volume of the varistor was not affected or even damaged by the cover layers.

The description of the objects disclosed herein is not limited to the individual specific embodiments. Rather, the features of the individual embodiments may be combined with one another in any desired manner—to the extent that this is technically feasible.

The invention claimed is:

1. A method for manufacturing a multilayer varistor, the method comprising:

providing a first ceramic powder for producing a first ceramic material and at least one second ceramic powder for producing a second ceramic material, wherein the ceramic powders differ from each other in concentration of monovalent elements $X^+$ by 50 ppm≤Δc($X^+$)≤5000 ppm, wherein $X^+$=($Li^+$, $Na^+$, $K^+$ or $Ag^+$), and wherein Δc denotes a maximum concentration difference occurring between an active region and a near-surface region of the multilayer varistor;

slicking of the ceramic powders and forming of green films;

partially printing of a part of the green films with a metal paste to form inner electrodes;

stacking printed and unprinted green films;

laminating, decarbonizing and sintering the green films; and applying outer electrodes.

2. The method according to claim 1, wherein partially printing comprises partially printing those green films with the metal paste which have a lower concentration of monovalent elements $X^+$ than remaining green films.

3. The method according to claim 1, wherein the green films are stacked such that the second ceramic material forms a cover layer of the multilayer varistor.

4. The method according to claim 1, wherein the ceramic powders comprise ZnO as a main component.

5. The method according to claim 1, wherein the ceramic materials comprise a varistor forming oxide or a rare earth oxide and further oxides.

6. The method according to claim 1, wherein the ceramic materials are additionally doped with Pr, La or Y.

7. The method according to claim 1, wherein the ceramic materials differ in a potassium content and a lanthanum content in a ppm range.

8. The method according to claim 1, wherein the second ceramic material arranged in the near-surface region is doped with moo ppm potassium.

9. The method according to claim 8, wherein the second ceramic material is additionally doped with 1000 ppm La.

10. The method according to claim 9, wherein the lanthanum doped second ceramic material has a reduced stray capacitance compared to the second ceramic material only doped with potassium.

11. The method according to claim 1, wherein the first ceramic material has the lowest concentration of monovalent elements $X^+$, and wherein the second ceramic material has the highest concentration of monovalent elements $X^+$.

12. The method according to claim 1, further comprising providing a third ceramic powder for producing a third ceramic material, wherein a concentration of monovalent elements $X^+$ in the third ceramic powder is lower than the concentration of monovalent elements $X^+$ in the second ceramic powder but higher than the concentration of monovalent elements $X^+$ in the first ceramic powder.

13. The method according to claim 1, wherein the green films are stacked such that the multilayer varistor has a defined concentration gradient of monovalent elements $X^+$, and wherein a concentration decreases starting from the second ceramic material to the first ceramic material.

14. A multilayer varistor comprising:

a ceramic body having a plurality of inner electrodes, an active region and a near-surface region, at least one first ceramic material and at least one second ceramic material, wherein the ceramic materials differ from each other in a concentration of monovalent elements $X^+$ by a maximum of 50 ppm≤Δc($X^+$)≤5000 ppm, wherein $X^+$=($Li^+$, $Na^+$, $K^+$ or $Ag^+$), wherein Δc denotes a maximum concentration difference occurring between the active region and the near-surface region, wherein the ceramic body comprises at least three ceramic materials, and wherein a third ceramic material is arranged between the first ceramic material and the second ceramic material.

15. The multilayer varistor according to claim 14, wherein the first ceramic material is arranged in the active region, and wherein the second ceramic material forms an insulating cover layer of the ceramic body.

16. The multilayer varistor according to claim 14, wherein the ceramic materials comprise a varistor forming oxide or a rare earth oxide and further oxides.

17. The multilayer varistor according to claim 16, wherein the ceramic materials are additionally doped with Pr, La or Y.

18. The multilayer varistor according to claim 14, wherein the second ceramic material is doped with moo ppm potassium.

19. The multilayer varistor according to claim 18, wherein the second ceramic material is additionally doped with moo ppm La.

20. The multilayer varistor according to claim 19, wherein the lanthanum doped second ceramic material has a reduced stray capacitance compared to the second ceramic material only doped with potassium.

21. The multilayer varistor according to claim 14, wherein the third ceramic material has a medium concentration of monovalent elements $X^+$.

22. The multilayer varistor according to claim 14, wherein a relative permittivity εr of the second ceramic material and a relative permittivity εr of the third ceramic material is lower than a relative permittivity εr of the first ceramic material.

23. The multilayer varistor according to claim 14, wherein the highest concentration of monovalent elements $X^+$ is present in the near-surface region, and wherein the lowest concentration of monovalent elements $X^+$ is present in the active region.

24. The multilayer varistor according to claim 14, wherein the first ceramic material has the lowest concentration of monovalent elements $X^+$, and wherein the second ceramic material has the highest concentration of monovalent elements $X^+$.

25. The multilayer varistor according to claim 14, wherein the ceramic materials differ chemically from each other by ≤1%.

26. The multilayer varistor according to claim 14, wherein relative permittivities $\varepsilon r$ of the first and second ceramic materials differ from each other by a factor ≤5.

27. The multilayer varistor according to claim 14, wherein the concentration of monovalent elements $X^+$ in the active region is <100 ppm.

28. The multilayer varistor according to claim 14, wherein the concentration of monovalent elements $X^+$ decreases gradually starting from the near-surface region towards the active region.

29. The multilayer varistor according to claim 14, wherein a thickness of the second ceramic material and/or a thickness of the third ceramic material is/are adapted to a diffusion behavior of the monovalent elements such that as little diffusion as possible of acceptors into the active region occurs.

30. The multilayer varistor according to claim 14, wherein the ceramic materials are based on ZnO.

31. A multilayer varistor comprising:

a ceramic body having a plurality of inner electrodes, an active region and a near-surface region, at least one first ceramic material and at least one second ceramic material, wherein the ceramic materials differ from each other in a concentration of monovalent elements $X^+$by a maximum of 50 ppm≤$\Delta c(X^+)$≤5000 ppm, wherein $X^+=(Li^+, Na^+, K^+ \text{ or } Ag^+)$, wherein Δc denotes a maximum concentration difference occurring between the active region and the near-surface region, and wherein the second ceramic material is doped with 1000 ppm potassium and additionally doped with 1000 ppm La.

* * * * *